United States Patent Office 3,823,233
Patented July 9, 1974

3,823,233
REMOVAL OF NITROGENOUS WASTE PRODUCTS WITH POLYALDEHYDES
Carmelo Giordano, Renato Esposito, and Giacomino Randazzo, Naples, Italy, assignors to Baxter Laboratories, Inc., Morton Grove, Ill.
No Drawing. Filed Jan. 6, 1971, Ser. No. 104,514
Claims priority, application Italy, Sept. 3, 1970, 53,194/70
Int. Cl. A61k 27/00
U.S. Cl. 424—180                            10 Claims

ABSTRACT OF THE DISCLOSURE

A process for preparing pure polyaldehydes by oxidation of polysaccharides such as starch. Said polyaldehydes are able to trap in vivo urea, ammonia and some other substance that generally increase in patients with renal or hepatic failure, and therefore can be used for the treatment of renal and hepatic failure.

---

This invention concerns the preparation of polyaldehydes obtained by oxidation of polysaccharides, and products obtained by this procedure. In particular this invention concerns a series of polyaldehyde substances that can trap in vivo urea, ammonia and some other substances that generally increase in patients with renal or hepatic failure.

Therefore this invention includes also the use of these polyaldehyde substances for the treatment of renal and hepatic failure.

At industrial level some processes for the preparation of these polyaldehydes by special oxidation are already known, but the so obtained products cannot be used in vivo without toxic symptoms because they are not pure enough. Up to now the clinical use of polyaldehydes has never been proposed.

Therefore, the purpose of this invention is to obtain by a modified oxidation procedure polyaldehyde substances from polysaccharides with a degree of purity sufficient to be used in vivo, without toxic effects, in patients with renal or hepatic failure.

Another purpose of this invention is the clinical application of polyaldehydes for treatment of hepatic or renal failure as well as the way of their administration or use in different cases. A clinical trial will also be reported.

The present invention concerns specifically a process for the preparation of a series of polyaldehydes obtained by controlled oxidation of polysaccharides; the process consists in putting in distilled water a polysaccharide, for instance, soluble starch or dextran, with equimolecular amounts of sodium metaperiodate or periodic acid in nitrogen atmosphere, at low temperature, in the absence of light with shaking, for a period of about 24 hours. Then one washes and thereafter dries or lyophilizes the obtained product. The time of reaction depends on the polysaccharide used and is determined by the consumption of periodate. In the experimental conditions mentioned above 24 hours are sufficient for the starch, 16 hours for dextran.

The best results are obtained with soluble starch or dextran, but also insoluble starch, cellulose or other polysaccharides can be used. While lower molecular weight polyaldehydes are used for the treatment of hepatic failure, it is preferred for high molecular weight polyaldehydes to be used in the treatment of renal failure, such as by oral administration of the high molecular weight polyaldehydes.

As stated above, the polysaccharide is put in contact with equimolecular amounts of sodium metaperiodate or periodic acid in distilled water, preferably cold, and in amount sufficient for solubilizing the sodium metaperiodate or periodic acid. For instance, 1,000 ml. of distilled water are sufficient for 65 gms. of sodium metaperiodate. The reaction must be carried out under nitrogen atmosphere at a preferable temperature of +4° C. and in the absence of light, to avoid overoxidation of products.

The stage of washing is different, depending on whether the polysaccharide source is insoluble or soluble in water. In particular the following procedures can be used:

(a) Polysaccharide source and obtained polyaldehyde insoluble in water

The product must be washed with distilled water to eliminate iodate and eventually periodate ions, until either lead nitrate or acetate or formate test is negative. Then the product is washed with a diluted solution of sulphuric acid, for instance a 2N solution; then removing the supernatant by low speed centrifugation or by decantation. The product must then be washed again to eliminate the sulphuric acid. If the final product is needed in the form of powder, it must be washed some more times with acetone (four washings are enough), then centrifuging at low speed and drying preferably under vacuum in the absence of light. Finally the product is ground to obtain a fine powder which is stored in the dark, under vacuum, if possible.

(b) Polysaccharide source and obtained polyaldehyde soluble in water

After the oxidation reaction is completed the product is dialyzed in common cellophane Visking tubing against water at temperature preferably between 20 and 35° C. for a length of time varying in accordance with the amount of product to be washed and the amount of dialyzing water. For example, 100 grams of product can be sufficiently dialyzed in 24 hours.

The product is then dialyzed against diluted sulphuric acid (for example 2N) at 30° C. and for 6–8 hours.

Finally the product must be dialyzed against water to eliminate sulphuric acid. If a solid compound is needed, lyophilization will be done in absence of light.

Products obtained by this invention have been completely characterized with physical and chemical methods. These products are rather soluble in water at lightly alkaline pH (pH 7.4).

If put in aqueous solution at 25° C. they give an acid reaction (pH 3.5–4.5). The solution so obtained does not react with saturated $NaHCO_3$ indicating absence of organic and inorganic acids. After oxidation in accordance with this invention, starches no longer form complexes with $I_2$.

The rotatory power of products studied in saturated aqueous solution at 25° C. is the reverse of that shown by original reagents. These substances give a positive Fehling reaction; besides, they are not attacked by specific enzymes, such as beta-amylasese for starch.

The oxidation reaction is a quantitative one as shown by elemental analysis of oxy-starch, which agrees perfectly with theoretical data. In fact the percentages of carbon and hydrogen for the formula $C_6H_8O_5$ are respectively:

Calculated (percent): C, 45.00; H, 5.00. Found (percent): C, 44.82; H, 5.28.

Such results, valid also for the other products, indicate the absence of inorganic ions as well as of combustion residues.

The percentage of aldehyde groups as tested with hydroxylamine and p-nitrophenylhydrazine methods was 93–98%. The percentage of non-oxidized glucosidic residues was complementary to the percentage of aldehyde groupings.

Formaldehyde concentration is negligible: between $1\times10^{-6}$ and $1\times10^{-5}$. Total acidity by titration with NaOH varied from 0 to 1% using methyl red as indicator.

Infrared spectrum shows characteristic bands at 3500 cm.$^{-1}$ (OH) and 1100 cm.$^{-1}$ (C—O—C), whereas the aldehyde C=O band is very weak.

Such result leads to the possible existance of a hemiacetal closed form in a given equilibrium with a dialdehyde open form. Working on a model molecule, diglutaraldehyde, nuclear magnetic resonance analysis data were obtained indicating that such equilibrium is pH dependent and that both the cyclic hemiacetalic form and the open form really exist in equilibrium. At pH neutral such equilibrium is 3:1 in favour of the closed structure. This calculation was obtained by integrating area peak of triplet of the cyclic form and singlet of the open structure. By increasing the acidity, equilibrium is shifted in favour of the open form. In fact addition of a drop of 6N hydrochloric acid cancels at nuclear magnetic resonance analysis the triplet peak.

Animal toxicity

Growing mice were given oxidized starch by mouth in the form of 10% addition to Purina chow. For this purpose two groups of 10 mice each were employed. Group A as control was given normal Purina chow. Group B was given Purina chow containing 10% of oxidized starch. The mice were watched every day, weighed every week and studied for a period of three months. Growth curves were the same in both groups A and B. No apparent symptomatology was detectable in group B. At autopsy and at microscopic studies no abnormal findings were revealed in intestine, kidney and liver.

Clinical use

Use of the above polyaldehyde compounds has been employed in treatment of renal failure.

Daily oral administration of 20 grams of polyaldehyde results in a net decrease of azotemia. This is due to the fact that urea present in gastrointestinal tract is bound to polyaldehyde. Therefore, it leaves the body with feces, giving rise to fecal nitrogen content. In patients requiring dialysis because of terminal uremia, when given 20 grams of polyaldehyde by mouth, the interval is prolonged between dialyses. The high capacity which oxidized polysaccharides show towards urea is such that it may be used as urea-adsorbent in an artificial kidney. Reactivity of polyaldehyde with urea "in vitro" was as high as 1:1 to 3:1 in moles. "In vivo," 20 grams of oxidized starch given to a group of patients with renal failure resulted in a daily mean decrease of blood urea concentration of 15 mg. percent.

Polyaldehyde may be used in removing large amounts of urea during peritoneal dialysis, which is notoriously a slow urea removal procedure.

In fact, the addition of 0.5% of polyaldehyde to peritoneal dialysis fluid is able to speed the efficiency of dialysis, to reduce its length, and thus it avoids large loss of aminoacids and proteins. Another application of polyaldehyde is in liver failure since it easily binds to ammonia.

In fact, the administration of oxidized dextran given intravenously to patients with liver cirrhosis results in lowering of both urea and blood ammonia, the latter being a major toxic factor in this disease.

Clinical trial

Data concerning clinical use of polyaldehyde in a group of 12 renal patients and in a group of 3 patients with liver cirrhosis are reported.

(A) Renal patients.—Oral administration of polyaldehyde to 4 uremic patients resulted in daily blood urea decrement of 15 mg. percent.

In three patients with virtually no renal function, kept, therefore, alive with dialysis treatment, the daily oral administration of 20 grams of polyaldehyde doubled the interval between hemodialysis and prolonged three times the interval between peritoneal dialysis.

Furthermore, in three patients on regular hemodialysis treatment the addition of 1% polyaldehyde to the dialysis bath reduced by 40% the time occurred to achieve a normal decrease in blood urea.

The addition of 0.5% polyaldehyde to peritoneal dialysis fluid enabled one to reduce dialysis time to 14 hours instead of the customary 24 hours in two patients. This also reduced the loss of proteins which in peritoneal dialysis is a function of time and hampers its clinical use.

(B) Liver patients.—In three patients with severe hepatic insufficiency characterized by a high blood ammonia level, intravenous administration of 500 ml. of 6% oxidized dextran lowered blood ammonia, reversing neurologic symptoms.

Having thus described the present invention, what is claimed is:

1. The method of administering to a living subject an effective amount of polyaldehyde prepared by the partial oxidation of a polysaccharide selected from the group consisting of dextran, starch and cellulose whereby nitrogenous waste products from said living subject are bound to the polyaldehyde for removal therewith.

2. The method of Claim 1 in which said polyaldehyde is made from starch.

3. The method of Claim 1 in which said polyaldehyde is made from dextran.

4. The method of Claim 1 in which said polyaldehyde is administered by the technique of peritoneal dialysis.

5. The method of Claim 4 in which said polyaldehyde is administered as a 0.5 percent dispersion in peritoneal dialysis solution.

6. The method of Claim 1 in which said polyaldehyde is administered by the technique of hemodialysis.

7. The method of Claim 6 in which said polyaldehyde is administered as a one percent dispersion in hemodialysis solution.

8. The method of orally administering to a living subject an effective amount of polyaldehyde prepared by the partial oxidation of a polysaccharide selected from the group consisting of dextran starch and cellulose to bind nitrogenous waste products in the gastrointestinal tract, whereby said waste products in the living subject are removed as said polyaldehyde is excreted.

9. The method of Claim 8 in which said polyaldehyde is made from starch.

10. The method of Claim 9 in which about 20 grams of polyaldehyde are orally administered daily to a human subject.

No references cited.

SAM ROSEN, Primary Examiner

UNITED STATES PATENT OFFICE
CERTIFICATE OF CORRECTION

Patent No. 3,823,233     Dated     July 9, 1974

Inventor(s) Carmelo Giordano, Renato Esposito, and Giacomino Randazzo

It is certified that error appears in the above-identified patent and that said Letters Patent are hereby corrected as shown below:

Column 1, line 18, delete "substance" and insert --substances--;

Column 1, line 55, after the word "light" insert --,--(a comma);

Column 2, line 56, delete "beta-amylasese" and insert --beta-amylase,--.

Signed and sealed this 29th day of October 1974.

(SEAL)
Attest:

McCOY M. GIBSON JR.
Attesting Officer

C. MARSHALL DANN
Commissioner of Patents